United States Patent [19]

Kruger et al.

[11] 4,456,926
[45] Jun. 26, 1984

[54] ENHANCEMENT OF FLUROSCOPICALLY GENERATED IMAGES

[75] Inventors: Robert A. Kruger, Salt Lake City, Utah; Stanley N. Baron, Stamford, Conn.; Ping Y. Liu, Peking, China

[73] Assignee: Thomson-CSF Broadcast, Inc., Stamford, Conn.

[21] Appl. No.: 390,512

[22] Filed: Jun. 21, 1982

[51] Int. Cl.³ .............................................. H04N 7/18
[52] U.S. Cl. .................................... 358/111; 364/414; 378/99
[58] Field of Search ........................ 358/111; 364/414; 378/99

[56] References Cited

PUBLICATIONS

R. A. Kruger, "A Digital Video Image Processor For Real-Time X-Ray Subtraction Imaging", *Optical Engineering*, vol. 17, No. 6, Nov.–Dec. 1978, pp. 652–657.

*Primary Examiner*—Howard W. Britton
*Attorney, Agent, or Firm*—Martin Novack

[57] ABSTRACT

An apparatus and method is disclosed for generating a processed video signal representative of an x-ray image. A filter function is employed that is retrospectively matched to the temporal response of a bolus of contrast material passing through a body region of interest.

62 Claims, 5 Drawing Figures

ENHANCEMENT OF FLUROSCOPICALLY GENERATED IMAGES

BACKGROUND OF THE INVENTION

This invention relates to the obtainment of radiographic images and, more particularly, to an apparatus and method for obtaining improved images of opacified anatomy using a fluoroscopic type of equipment in conjunction with a video processor.

A typical x-ray fluoroscopy apparatus includes an x-ray source and an image intensifier which is used to detect the x-radiation. The output of the image intensifier is viewed by a television camera, and the resultant television signal can be presented on a monitor and/or recorded. When a body, such as that of a patient, is interposed between the x-ray source and the detector, x-rays are absorbed in varying degrees depending upon the thickness and composition of different regions of the body. This results in the presentation of a two-dimensional image that can be used, for example, for diagnosing structural abnormalities within the body.

The ability to "see" structure in the body using the described technique depends on the x-ray absorption properties of the structure of interest in relation to the x-ray absorption properties of the material(s) adjacent to the structure. The greater the difference, the greater the "contrast" the structure of interest will have in the resulting television image. The greater the contrast, the greater the clarity of the structure in the image. Consequently, achieving high contrast is a desirable quality with this imaging procedure.

Radiographic contrast agents are used to create a large difference in x-ray absorption behavior where little or none previously existed. For example, blood vessels are virtually invisible on fluoroscopic images (except in the chest) because blood, muscle, fat and soft tissue all possess similar x-ray absorption behavior. Radiographic contrast agents contain material (e.g. air, barium, iodine) which has x-ray absorption properties dissimilar to blood, muscle, fat and the soft tissue. For example, when a bolus of iodinated liquid contrast material is injected into an artery or vein, the vascular structure is given artificially higher contrast on an x-ray image while the contrast material is present within a certain vascular segment.

Digital video processing has been previously employed to improve radiographic imaging. Successful prior art digital processing techniques for image contrast enhancement have taken advantage of a priori knowledge of the time course behavior of radio-opaque contrast agents. By isolating and imaging the flow of such contrast agents through preselected arteries and organs within the body, both anatomical and physiological information related to organ function have been obtained without the need for selective catherization and its attendant risks.

So-called mask-mode imaging is a straightforward form of time-dependent subtraction imaging implemented by digital processing. A patient is placed on an x-ray table and a region of interest is chosen for study, e.g., the carotid arteries, or a heart chamber. A small needle is placed in an arm vein, through which 30–50 ml of iodinated contrast agent later is typically injected. Prior to injection, a single digital image is formed over several video frames (typically one to four) and stored in a digital memory. The contrast agent then is injected rapidly (e.g. in three to five seconds) and flows to the right heart, then to the lungs and to the left heart chambers from where it is pumped throughout the body's arterial system. As the contrast material passes through the region of interest, a sequence of additional images is accumulated within a second digital memory. Each of these post-opacification images is subtracted sequentially from the preinjection image. Subtraction images formed in this way have been synthesized at about one image per second for relatively stationary arterial structures. For rapidly moving cardiac structures the rate has been increased to about fifteen to sixty images per second.

The time-dependent subtraction images thus formed ideally would display only opacified cardiovascular anatomy. In the absence of patient motion, image contrast due to unopacified anatomy, e.g. bones, is removed. The removal of extraneous image information permits contrast enhancement of the opacified structures. Once enhanced, the subtraction images are reconverted to video format and stored, e.g. on a video tape or a video disc. The entire processing and external storage can proceed in real-time with the patient on the table.

In the copending U.S. patent application Ser. No. 342,376, assigned to the same assignee as the present application, there is disclosed a technique whereby recursive filtering is employed to filter radiographically-generated video signals with a filter function having a temporal frequency substantially corresponding to the expected temporal frequency of the movement of the bolus of contrast material through a region of a body being imaged. The video image processed in this manner tends to enhance portions of the image through which contrast material has moved while attenuating contributions from stationary tissue and from tissue moving at a substantially higher temporal frequency than the bandpass peak.

While both subtraction and recursive filtering techniques, as described, are used to advantage in the art in improving radiographically-generated images, it is an object of the present invention to set forth a video enhancement technique that exhibits even further improvement.

SUMMARY OF THE INVENTION

The subtraction technique referred to above can be thought of as retrospective filtering which discards most of the data (i.e. video frames other than the frames which are the subject of the subtraction). The above-referenced recursive filtering technique, on the other hand, chooses a filter characteristic prospectively, the choice of filter being based on a priori assemptions as to the shape of the contrast dilution curve. In these respects, the prior art techniques represent compromises.

The present invention utilizes substantially all the data collected and also incorporates retrospective knowledge of the actual imaging characteristics of the body region of interest during the passage of the contrast bolus.

In accordance with an embodiment of the invention, there is provided an apparatus and method for generating a processed video signal representative of an image of a body. A source of radiation is directable at the body, and means are provided for detecting radiation received from the body and for converting the detected radiation into an electronic video signal. Means are provided for storing a series of frames of the video signal as digital pixel values. The digital pixel values are generally representative of the radiation absorption characteristic of the body portion corresponding to the elemental pixel position of the frame, although it will be understood that other characteristics, such as transmissivity, could be processed in accordance with the principles hereof, if desired. Means are provided for determining, for each frame i of the series, an average pixel value, $S_i$, for the frame. Means are also provided for determining, for each frame, i, of the series, an enhancement value (or filter coefficient), $k_i$, as a function of $S_i$. Preferably, the enhancement value $k_i$ is determined as the difference between $S_i$ and $\overline{S}$, where $\overline{S}$ is the average of $S_i$ over the sequense of frames. The enhancement values $k_i$ can be of either positive or negative value. Further means are provided for combining the pixel values of the pixels of each of the stored frames, i, with the enhancement value, $k_i$, for the frame, to obtain enhanced pixel values. Means are then provided for combining the enhanced pixel values of corresponding pixels of the frames of the sequence to obtain a processed pixel value at each pixel position. The processed pixel values can be converted to analog form for display.

In the present embodiment, the absorption densities used in determining $k_i$ for each frame i are obtained within a preselected portion of the frame defined by a window area. If the window area is selected to include most or all of the body region of interest through which the bolus of contrast material will pass during the sequence of frames being processed, then limiting the determination of $k_i$ to depend on the pixel values within the window area will result in the effective filter characteristic providing a better "match" to the bolus' temporal response than if the full frame area was considered for this determination.

Applicants have determined that the technique of the present invention provides improvement of signal to noise ratio that allows very substantial reductions, as compared to prior art techniques, in the dose of contrast material necessary to obtain an image of given quality.

Further features and advantages of the invention will become more readily apparent from the following detailed description when taken in conjunction with the accompanying drawings.

DESCRIPTION OF THE PREFERRED EMBODIMENT

Figure 1:
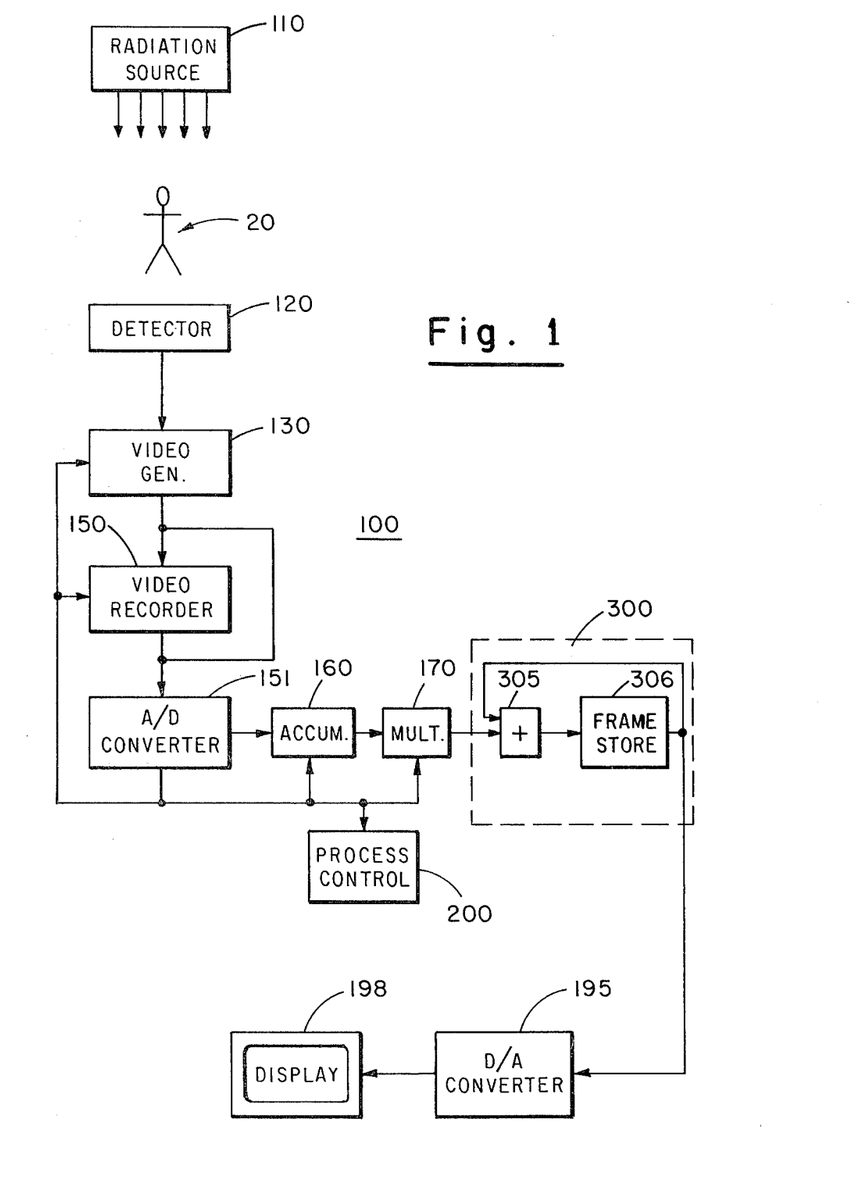
FIG. 1 is a block diagram of an apparatus in accordance with the invention and which can be used to practice the method of the invention.

Referring to FIG. 1 there is shown a block diagram of an apparatus 100 for obtaining a displayed image of the internal structure of a body 20. The apparatus 100 conventionally includes a radiation source 110, typically an x-ray source, a detector 120, and a video generator 130. The combination of detector and video generator may include, for example, an x-ray image intensifier in conjunction with a television camera. The output of video generator 130 is coupled to video recorder 150, and also to an analog-to-digital converter 151 which converts the television signal into digital form. The output of recorder 150 is also coupled to the converter 151. Equipment for obtaining the digitized television signal is well known in the art and commercially available, an example being the model AD-964310 manufactured by Thomson-CSF Broadcast, Inc. At each pixel of the video frame, the television signal digitizer generates an eight bit digital signal representative of one of 256 gradations of luminance level (for a monochrome signal—as considered in the present illustrated embodiment). The video recorder 150 may be any suitable recording device such as a video tape recorder or disc recorder. The video generator, the video recorder, and the analog-to-digital converter conventionally receive synchronizing signals, and the analog-to-digital converter also receives clock signals at the pixel rate.

The output of the analog-to-digital converter 151 is coupled to processing circuitry 200 which may comprise a general purpose digital computer or microprocessor or special purpose digital electronics. The output of the analog-to-digital converter 151 is also coupled to an arithmetic accumulator 160 which, in turn, is under control of and communicates with the processor 200. The video generator 130 and the video recorder 150 are also under control of the processor 200. The processor 200, may comprise for example a model 68000 microprocessor manufactured by Motorola Corp., or a so-called "bit slice" implementation thereof.

The output of the digital-to-analog converter 151 is also coupled to multiplier circuit 170 that is under control of the processor 200. The output of multiplier circuit is coupled to another accumulator 300 which includes frame store 305 and summing circuit 306. The output of accumulator 300 is coupled to a digital-to-analog converter 195 whose output is coupled to display 198 and to a video recorder, which may be recorder 150. Again, it is assumed that vertical and horizontal sync signals, as well as clock signals, are conventionally available from sync and clock generation circuitry (not shown).

Before describing the operation of the system and the control thereof, some theoretical considerations will be set forth.

Any temporal filtering scheme can be represented in the frequency domain by its associated temporal frequency response (amplitude and phase) or in the time domain by its impulse response. Consider the time domain. If a filter input signal is denoted by s(t) and the impulse response of that filter is denoted by f(t), then the filter output, s'(t), is given by $$s'(t) = s(t) * f(t) \tag{1}$$

$$= \int_{-\infty}^{\infty} s(t') f(t - t') \, dt', \tag{2}$$

where * denotes convolution. For the case where the signal is a set of N discrete samples of s(t) spanning T seconds the filter output is a discrete sum given by $$s'[i] = \sum_{j=-\infty}^{\infty} s[j] f[i - j] \tag{3}$$

where s[i] is the i-th sample of s(t) and f[i] is the i-th sample of f(t). For a causal input signal and a causal filter, eq. (3) becomes $$s'[i] = \sum_{j=0}^{i} s[j] f[i-j] \quad (3)'$$

The n-th output is $$s'[N] = \sum_{j=0}^{N} s[j] f[N-j] \quad (4)$$

or $$s'[N] = \sum_{j=0}^{N} k_j s[j], \quad (4)'$$

where $$k_j = f[N-j]. \quad (5)$$

Note that eq. (4)' is a weighted sum of all the input samples ending with the N-th sample.

Any filtering approach operating on a discrete set of data samples can be thought of as a linear combination of the data samples. Visualized in this way, mask mode subtraction imaging, noted in the Background hereof, is a special case of retrospective filtering where the $k_j$ of eq. (4)' are chosen according to $$k_j = \begin{cases} 1, j = l \\ -1, j = m, \\ 0, \text{ all other } j. \end{cases}$$

The l-th sample is chosen near the time of maximum opacification and the m-th sample is chosen at a time corresponding to low opacification. The other N-2 samples are discarded.

For the above-described recursive filtering, as in copending U.S. application Ser. No.342,376, most of the $k_j$ are non-zero. Therefore, each data sample is used, but the $k_j$, which are related to the filter impulse response, are chosen prospectively (e.g. to match the bolus' temporal response) and are uninfluenced by specific knowledge of the set of samples $\{s[j]\}$.

Subtraction techniques, therefore, can be thought of as a retrospective filtering process which discards most of the data. Recursive filtering, while using most of the data, employs a fixed prospective filter whose choice is based on a priori assumptions as to the shape of the contrast dilution curve. Each method represents a compromise.

The present filtering method, which utilizes substantially all the data collected and which incorporates retrospective knowledge of $\{s[j]\}$ has advantages of both imaging approaches. Given the sample set $\{s[j]\}$, one can choose the $k_j$ in a way which will optimize $$\sum_{j=0}^{N} k_j s[j] \quad 60$$

according to a selected criterion. If the $k_j$ are chosen such that the signal to noise ratio of the N-th output is maximized while concurrently eliminating the stationary background anatomy, the signal (S) and noise (n) associated with a single pixel for the filtering procedure are given as $$S \equiv s'[N] = \sum_{j=0}^{N} k_j s[j], \quad (6)$$

$$n = \left[ \sum_{j=0}^{N} k_j^2 \sigma^2 \right]^{\frac{1}{2}}, \quad (7)$$

where $\sigma$ is the standard deviation of the noise per pixel for each sample. Equation (7) assumes that the sample noise, $\sigma$, is uncorrelated from sample to sample, and that $\sigma$ is independent of j. In order to insure that the stationary background anatomy on the N-th output is cancelled we impose the condition that $$\sum_{j=0}^{N} k_j = 0.$$

With this condition we can rewrite Eq. (6) as $$S = \sum_{j=0}^{N} k_j s[j] = \sum_{j=1}^{N} k_j (s[j] - c), \quad (8)$$

where c is an arbitrary constant. S/n is maximized by setting $$\frac{\partial (S/n)}{\partial k_i} = 0, \quad i = 0, 1, \ldots N. \quad (9)$$

Substituting Eqs. (7) and (8) into Eq. (9) and solving for $k_i$ gives the following expression $$k_i = \left[ \frac{\sum_{j=0}^{N} k_j^2}{\sum_{j=0}^{N} k_j (s[j] - c)} \right] (s[i] - c), i = 0, 1, \ldots N. \quad (10)$$

Eq. 10 can be rewritten as $$k_i = a(\{k_j\}) (s[i] - c), \quad i = 0, 1, \ldots N, \quad (11)$$

where $a(\{k_j\})$ is a proportionally constant which depends on $\{k_j\}$:

$$\frac{\sum_{j=0}^{N} k_j^2}{\sum_{j=0}^{N} k_j (s[j] - c)} = a(\{k_j\}) \quad (12)$$

To determine how the quantity $a(\{k_j\})$ affects S/n, we substitute Eq. (12) into eqs. (7) and (8) and evaluate S/n to obtain $$\frac{S}{n} = \frac{\sum_{i=0}^{N} [a(\{k_j\})](s[i] - c)^2}{\left( \sum_{i=0}^{N} [a^2(\{k_j\})](s[i] - c)^2 \sigma^2 \right)^{\frac{1}{2}}}, \quad (13)$$

$$= \frac{\sum_{i=0}^{N} (s[i] - c)^2}{\left[ \sum_{i=0}^{N} (s[i] - c)^2 \sigma^2 \right]^{\frac{1}{2}}}, \quad (14)$$

which is independent of $a(\{k_j\})$. For simplicity, choose $a(\{k_j\}) = 1$. A choice of $k_i$ which maximizes S/n, therefore is $$k_i = s[i] - c. \qquad (15)$$

Remembering that $$\sum_{i=0}^{N} k_i = 0,$$

we can evaluate c as follows:

$$\sum_{i=0}^{N} k_i = \sum_{i=0}^{N} (s[i] - c) = 0 \qquad (16)$$

$$=> c = \frac{1}{N+1} \sum_{i=0}^{N} s[i] = \bar{s}$$

where $\bar{s}$ is the mean of $\{s(i)\}$. Finally, a choice of $k_i$ which maximizes S/n is $$k_i = s[i] - \bar{s} \quad i = 0, 1, 2, \ldots N. \qquad (17)$$

Recalling Eq. (5), the impulse response of the filter is $$f[i] = k_{N-i} = s[N-i] - \bar{s}. \qquad (17)'$$

Using Eq. (17) one can evaluate S/n from Eqs. (7) and (8) as $$\frac{S}{n} = \frac{\sum_{i=0}^{N} (s[i] - \bar{s})^2}{\sigma \left[\sum_{i=0}^{N} (s[i] - \bar{s})^2\right]^{\frac{1}{2}}} = \frac{1}{\sigma} \left[\sum_{i=0}^{N} (s[i] - \bar{s})^2\right]^{\frac{1}{2}} \text{ or} \qquad (18)$$

$$\frac{S}{n} = \frac{(N+1)^{\frac{1}{2}}(s[i] - \bar{s})_{rms}}{\sigma}, \text{ where}$$

$$(s[i] - \bar{s})_{rms} \equiv \left(\frac{1}{N+1} \sum_{i=0}^{N} (s[i] - \bar{s})^2\right)^{\frac{1}{2}} \qquad (19)$$

and $(s[i] - \bar{s})_{rms}$ is evaluated only for the samples which are used for filtering. The quantity N+1 is the number of input samples which is retained for processing.

Figure 2:
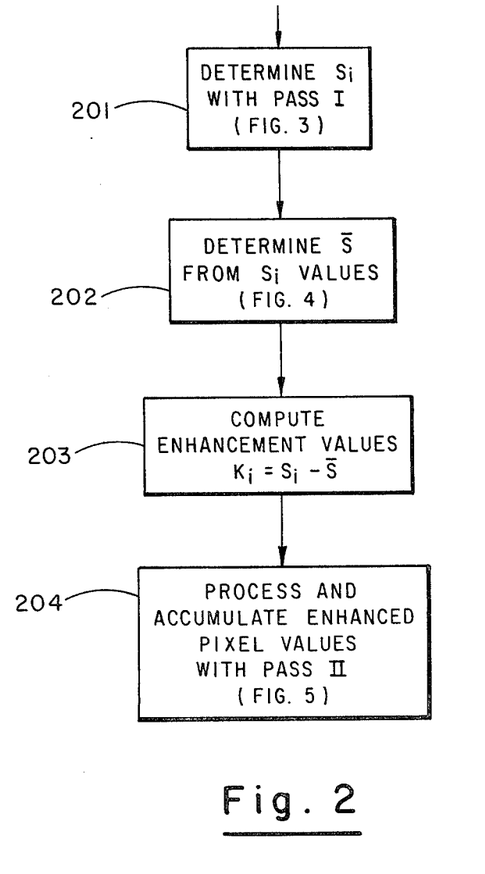
FIG. 2 is a basic flow diagram for controlling the processing circuitry of the FIG. 1 embodiment.
Figure 3:
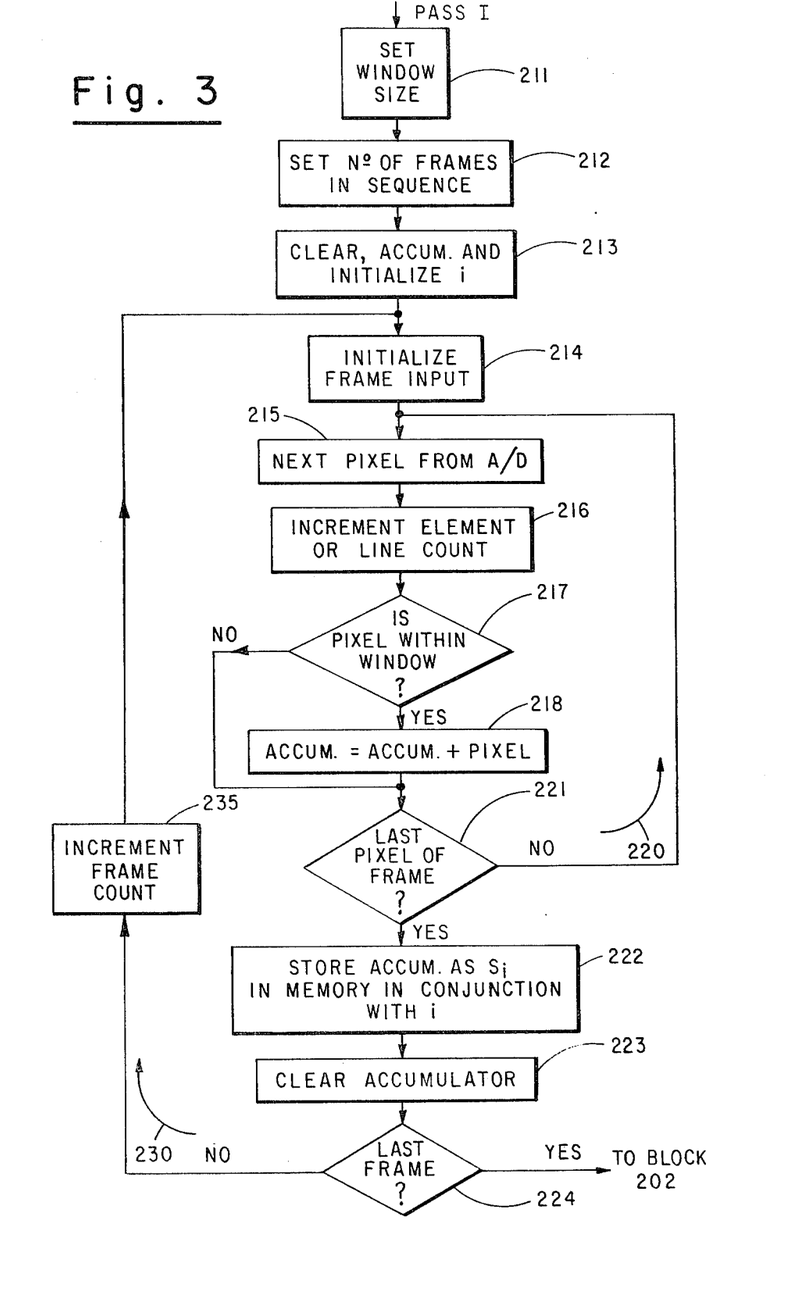
FIG. 3 is a flow diagram illustrating the pass I routine of FIG. 2.
Figure 4:
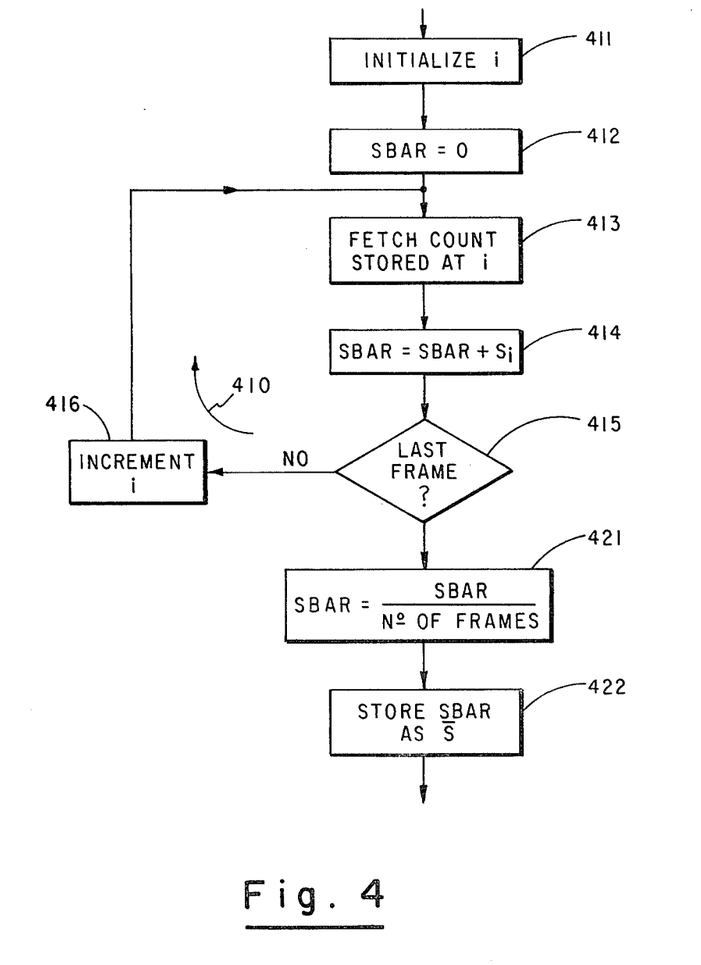
FIG. 4 is a flow diagram of the routine of FIG. 2 for determining $\overline{S}$.
Figure 5:
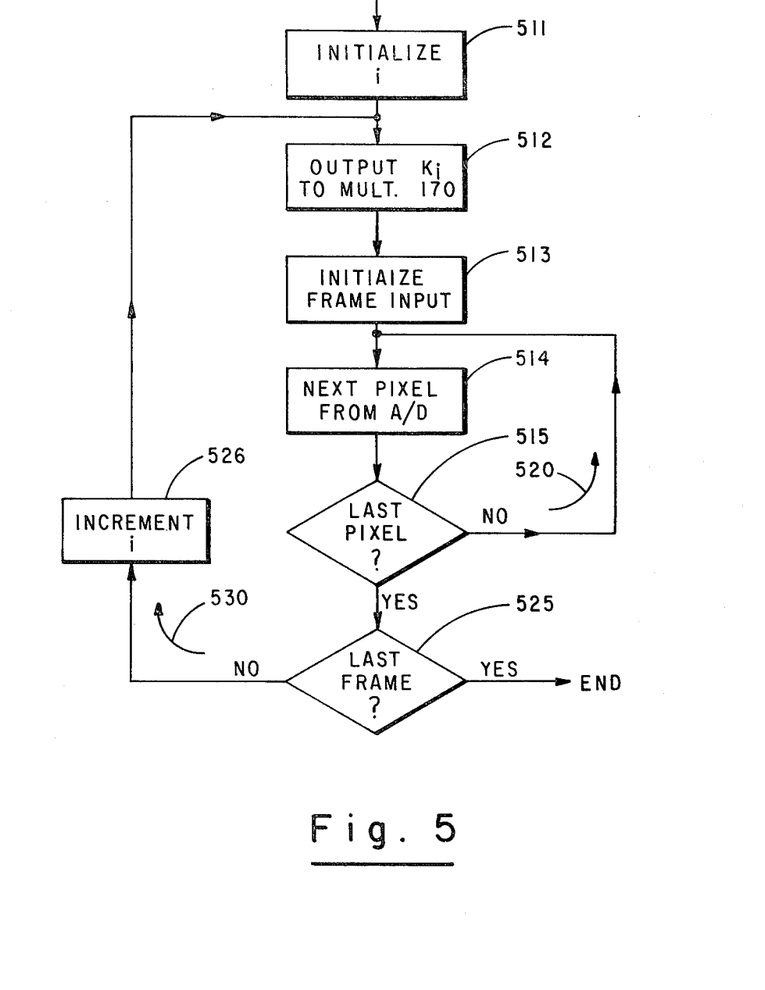
FIG. 5 is a flow diagram of the pass II routine of FIG. 2.

FIG. 2 is a basic flow diagram which, when taken in conjunction with the flow diagrams referred to therein, shows how processing circuitry 200 is programmed to control operation of the circuit of FIG. 1 in accordance with the present embodiment. The block 201 represents the determination of the average pixel value, $S_i$ for each frame i. The routine for this operation, designated as "pass I", is shown in FIG. 3. Having obtained value $S_i$ for each frame of the sequence, the $S_i$ values are averaged as represented by block 202, to obtain an overall average value, designated $\bar{S}$. The routine for this operation is shown in FIG. 4. An enhancement value, $k_i$, for each frame is then obtained, consistent with relationship (17) above, as represented by block 203. Pass II is then implemented, whereby, for each frame i of the sequence, the pixel value of each pixel is multiplied by $k_i$. The routine for this operation is shown in FIG. 5. The corresponding enhanced pixel values from each frame of the sequence are accumulated in accumulator 300 (FIG. 1), consistent with relationship (4)' above. As each enhanced pixel value is output from multiplier 170, it is added, by summer 306, to the accumulated value for the particular pixel that is fed back from frame store 305. The new accumulated value is then restored to the particular pixel position of frame store 305. When all frames have been processed, the frame store 305 will hold the desired accumulated pixel value at each pixel position.

FIG. 3 illustrates the pass I routine for obtaining the value $S_i$ for each frame i of the sequence. The block 211 represents the operator selection of the window area. As described above, the window defines the area in which overall average pixel value $\bar{S}$ of the present embodiment is obtained. The operator may select the window area by, for example, moving a conventional cursor dot to the diagonally opposite corners of the window area and inputting the coordinates of these corners. Alternatively, the coordinates of the area corners could be conventionally input via a keyboard. The operator can also input the number of frames in the sequence of frames to be processed (block 212). The accumulator 160 (FIG. 1) is cleared, and the frame count i is initialized at one (block 213). The block 214 represents the inputting of the next frame of video from video generator 150 via analog-to-digital converter 151. The loop 220 is then entered, this loop representing the implementation of the procedure whereby the average $S_i$ is obtained for the frame i. In particular, individual pixel values are read in from analog-to-digital converter 151 (block 215), and the pixel element or line count, as the case may be, is incremented (block 216). A determination is made (diamond 217) as to whether or not the current pixel is within the predetermined window area. If it is, block 218 is entered, this block representing the incrementing of the accumulator count by the current pixel value. If the pixel is not within the window, block 218 is skipped. Determination is then made (diamond 221) if the last pixel of the window has been processed. If not, the loop 220 is continued until the frame i has been completed. (Since only pixels within the window enter into determination of $S_i$ in this embodiment, it is not necessary to continue considering pixels once the lower rightmost pixel of the window has been reached.) The value of $S_i$ is then stored in memory in conjunction with the frame index i (block 222). The accumulator is then cleared (block 223) and determination is made (diamond 224) as to whether or not the last frame of the sequence has been processed. If not, loop 230 is continued by incrementing the frame count (block 235) and reentering block 214. The loop 230 continues until all $S_i$ for the sequence of frames have been determined and stored.

The flow diagram of FIG. 4 is representative of the routine of the block 202 of FIG. 2 whereby the individual $S_i$ values are averaged to obtain $\bar{S}$. The frame count is initialized (block 411), and a variable SBAR, used to accumulate the $S_i$ values, is initialized at zero (block 412). The stored value $S_i$ associated with i is fetched (block 413). SBAR is then increased by the fetched $S_i$, as represented by the block 414. Inquiry is then made (decision diamond 415) as to whether or not the last frame of the series has been reached. If not, the frame count is incremented (block 416), and the loop 410 is continued until all values $S_i$ have been added to SBAR. The block 421 is then entered, this block representing the division of the sum SBAR by the number of frames in the series, to obtain $\bar{S}$, the value which is then stored (block 422).

The flow diagram of FIG. 5 is representative of the pass II routine of block 204 of FIG. 2 whereby, for each frame i of the sequence, the pixel value of each pixel is multiplied by $k_i$ and the enhanced pixel value is added to the pixel value of corresponding pixels of the other frames of the sequence by accumulator 300 (FIG. 1). The frame index is initialized (block 511) and the enhancement value $k_i$ is output to multiplier 170 (block 512). The pixels of frame i of the sequence are input to multiplier 170 (block 513) one pixel at a time (block 514) from analog-to-digital converter 151. The loop 520 is continued until the last pixel of the frame is processed (diamond 515). Determination is then made (diamond 525) as to whether or not the last frame of the sequence has been processed. If not, the frame index is incremented (block 526) and the loop 530 is continued until all frames of the sequence have been processed.

The invention has been described with reference to a particular embodiment, but variations within the spirit and scope of the invention will occur to those skilled in the art. For example, it will be understood that, if desired, implementation of certain individual steps of the disclosed technique can be achieved under manual control or by using special purpose control circuitry.

We claim:

1. Apparatus for generating a processed video signal representative of an image of a body, comprising:
   a source of radiation directable at the body;
   means for detecting radiation received from the body;
   means for converting the detected radiation into an electronic video signal;
   means for storing a series of frames of said video signal as pixel values at respective pixel positions;
   means for determining, for each frame, i, of the series, an average pixel value, $S_i$, for the frame;
   means for determining, for each frame, of the series, an enhancement value, $k_i$, as a function of the average pixel value, $S_i$, for the frame;
   means for combining the pixel values of the pixels of each of the stored frames, i, with the enhancement value $k_i$ for the frame to obtain enhanced pixel values; and
   means for combining the enhanced pixel values of corresponding pixels of the frames of the sequence to obtain a processed pixel value at each pixel position.

2. Apparatus as defined by claim 1, wherein each enhancement value, $k_i$, is obtained from the difference $Si_i - \bar{S}$, where $\bar{S}$ is the average of the $S_i$ values 3. Apparatus as defined by claim 1, wherein said means for determining $S_i$ for each frame i is operative to sum the pixel values of the frame i.

4. Apparatus as defined by claim 2, wherein said means for determining $S_i$ for each frame i is operative to sum the pixel values of the frame i.

5. Apparatus as defined by claim 1, wherein said means for determining $S_i$ for each frame i is operative to sum the pixel values of the frame i within a preselected non-unity fractional area of the frame.

6. Apparatus as defined by claim 2, wherein said means for determining $S_i$ for each frame i is operative to sum the pixel values of the frame i within a preselected non-unity fractional area of the frame.

7. Apparatus as defined by claim 1, wherein each pixel value is representative of the absorption of x-rays of the elemental portion of the body at the position of the pixel.

8. Apparatus as defined by claim 2, wherein each pixel value is representative of the absorption of x-rays of the elemental portion of the body at the position of the pixel.

9. Apparatus as defined by claim 4, wherein each pixel value is representative of the absorption of x-rays of the elemental portion of the body at the position of the pixel.

10. Apparatus as defined by claim 6, wherein each pixel value is representative of the absorption of x-rays of the elemental portion of the body at the position of the pixel.

11. Apparatus as defined by claim 1, wherein said means for combining the enhanced pixel values of corresponding pixels of the frames is operative to add said pixel values of corresponding pixels.

12. Apparatus as defined by claim 2, wherein said means for combining the enhanced pixel values of corresponding pixels of the frames is operative to add said pixel values of corresponding pixels.

13. Apparatus as defined by claim 4, wherein said means for combining the enhanced pixel values of corresponding pixels of the frames is operative to add said pixel values of corresponding pixels.

14. Apparatus as defined by claim 6, wherein said means for combining the enhanced pixel values of corresponding pixels of the frames is operative to add said pixel values of corresponding pixels.

15. Apparatus as defined by claim 1, wherein said means for combining the pixel values of each of the stored frames, i, with the enhancement value $k_i$ for the frame is operative to multiply each of said pixel values of the frame i by $k_i$.

16. Apparatus as defined by claim 2, wherein said means for combining the pixel values of each of the stored frames, i, with the enhancement value $k_i$ for the frame is operative to multiply each of said pixel values of the frame i by $k_i$.

17. Apparatus as defined by claim 6, wherein said means for combining the pixel values of each of the stored frames, i, with the enhancement value $k_i$ for the frame is operative to multiply each of said pixel values of the frame i by $k_i$.

18. Apparatus as defined by claim 13, wherein said means for combining the pixel values of each of the stored frames, i, with the enhancement value $k_i$ for the frame is operative to multiply each of said pixel values of the frame i by $k_i$.

19. Apparatus as defined by claim 1, further comprising means for converting said processed pixel values from digital to analog form.

20. Apparatus as defined by claim 2, further comprising means for converting said processed pixel values from digital to analog form.

21. Apparatus as defined by claim 6, further comprising means for converting said processed pixel values to analog form.

22. Apparatus as defined by claim 13, further comprising means for converting said processed pixel values to analog form.

23. For use in conjunction with an x-ray system that includes a source of radiation directable at a body, means for detecting radiation received from the body, and means for converting the detected radiation into an electronic video signal; an apparatus for generating a processed video signal representative of an image of the body, comprising:

means for storing a series of frames of said video signal as pixel values at respective pixel positions;

means for determining, for each frame, i, of the series, an average pixel value, $S_i$, for the frame;

means for determining, for each frame, i, of the series, an enhancement value, $k_i$, as a function of the average pixel value, $S_i$, for the frame;

means for combining the pixel values of the pixels of each of the stored frames, i, with the enhancement value $k_i$ for the frame to obtain enhanced pixel values; and means for combining the enhanced pixel values of corresponding pixels of the frames of the sequence to obtain a processed pixel value at each pixel position.

24. Apparatus as defined by claim 23, wherein each enhancement value, $k_i$, is obtained from the difference $S_i - \bar{S}$, where $\bar{S}$ is the average of the $S_i$ values.

25. Apparatus as defined by claim 23, wherein said means for determining $S_i$ for each frame i is operative to sum the pixel values of the frame i.

26. Apparatus as defined by claim 24, wherein said means for determining $S_i$ for each frame i is operative to sum the pixel values of the frame i.

27. Apparatus as defined by claim 23, wherein said means for determining $S_i$ for each frame i is operative to sum the pixel values of the frame i within a preselected nonunity fractional area of the frame.

28. Apparatus as defined by claim 24, wherein said means for determining $S_i$ for each frame i is operative to sum the pixel values of the frame i within a preselected nonunity fractional area of the frame.

29. Apparatus as defined by claim 23, wherein each pixel value is representative of the absorption of x-rays of the elemental portion of the body at the position of the pixel.

30. Apparatus as defined by claim 24, wherein each pixel value is representative of the absorption of x-rays of the elemental portion of the body at the position of the pixel.

31. Apparatus as defined by claim 26, wherein each pixel value is representative of the absorption of x-rays of the elemental portion of the body at the position of the pixel.

32. Apparatus as defined by claim 28, wherein each pixel value is representative of the absorption of x-rays of the elemental portion of the body at the position of the pixel.

33. Apparatus as defined by claim 23, wherein said means for combining the enhanced pixel values of corresponding pixels of the frames is operative to add said pixel values of corresponding pixels.

34. Apparatus as defined by claim 24, wherein said means for combining the enhanced pixel values of corresponding pixels of the frames is operative to add said pixel values of corresponding pixels.

35. Apparatus as defined by claim 26, wherein said means for combining the enhanced pixel values of corresponding pixels of the frames is operative to add said pixel values of corresponding pixels.

36. Apparatus as defined by claim 28, wherein said means for combining the enhanced pixel values of corresponding pixels of the frames is operative to add said pixel values of corresponding pixels.

37. Apparatus as defined by claim 23, wherein said means for combining the pixel values of each of the stored frames, i, with the enhancement value $k_i$ for the frame is operative to multiply each of said pixel values of the frame i by $k_i$.

38. Apparatus as defined by claim 24, wherein said means for combining the pixel values of each of the stored frames, i, with the enhancement value $k_i$ for the frame is operative to multiply each of said pixel values of the frame i by $k_i$.

39. Apparatus as defined by claim 28, wherein said means for combining the pixel values of each of the stored frames, i, with the enhancement value $k_i$ for the frame is operative to multiply each of said pixel values of the frame i by $k_i$.

40. Apparatus as defined by claim 35, wherein said means for combining the pixel values of each of the stored frames, i, with the enhancement value $k_i$ for the frame is operative to multiply each of said pixel values of the frame i by $k_i$.

41. Apparatus as defined by claim 23, further comprising means for converting said processed pixel values from digital to analog form.

42. Apparatus as defined by claim 24, further comprising means for converting said processed pixel values from digital to analog form.

43. Apparatus as defined by claim 28, further comprising means for converting said processed pixel values from digital to analog form.

44. Apparatus as defined by claim 35, further comprising means for converting said processed pixel values from digital to analog form.

45. A method for generating a processed video signal representative of an image of a body, comprising the steps of:

directing radiation at the body;

detecting radiation received from the body;

converting the detected radiation into an electronic video signal;

storing a series of frames of said video signal as pixel values at respective pixel positions;

determining, for each frame of the series, an average pixel value for the frame;

determining, for each frame of the series, an enhancement value as a function of the average pixel value for the frame;

combining the pixel values of the pixels of each of the stored frames with the respective enhancement value for the frame to obtain enhanced pixel values; and combining the enhanced pixel values of corresponding pixels of the frames of the sequence to obtain a processed pixel value at each pixel position.

46. The method as defined by claim 1, wherein each enhancement value is obtained from the difference between the average pixel value for the frame and the overall average pixel value for all frames of the sequence.

47. The method as defined by claim 45, wherein said step of determining the average pixel value for each frame comprises summing the pixel values of the frame.

48. The method as defined by claim 46, wherein said step of determining the average pixel value for each frame comprises summing the pixel values of the frame.

49. The method as defined by claim 45, wherein said step of determining the average pixel value for each frame comprises summing the pixel values of the frame within a preselected non-unity fractional area of the frame.

50. The method as defined by claim 46, wherein said step of determining the average pixel value for each frame comprises summing the pixel values of the frame within a preselected non-unity fractional area of the frame.

51. The method as defined by claim 45, wherein each pixel value is representative of the absorption of x-rays of the elemental portion of the body at the position of the pixel.

52. The method as defined by claim 46, wherein each pixel value is representative of the absorption of x-rays of the elemental portion of the body at the position of the pixel.

53. The method as defined by claim 48, wherein each pixel value is representative of the absorption of x-rays of the elemental portion of the body at the position of the pixel.

54. The method as defined by claim 50, wherein each pixel value is representative of the absorption of x-rays of the elemental portion of the body at the position of the pixel.

55. The method as defined by claim 45, wherein said step of combining the enhanced pixel values of corresponding pixels of the frames comprises adding said pixel values of corresponding pixels.

56. The method as defined by claim 46, wherein said step of combining the enhanced pixel values of corresponding pixels of the frames comprises adding said pixel values of corresponding pixels.

57. The method as defined by claim 48, wherein said step of combining the enhanced pixel values of corresponding pixels of the frames comprises adding said pixel values of corresponding pixels.

58. The method as defined by claim 50, wherein said step of combining the enhanced pixel values of corresponding pixels of the frames comprises adding said pixel values of corresponding pixels.

59. The method as defined by claim 45, wherein said step of combining the pixel values of each of the stored frames with the enhancement value for the frame comprises multiplying each of said pixel values of the frame by the enhancement value for the frame.

60. The method as defined by claim 46, wherein said step of combining the pixel values of each of the stored frames with the enhancement value for the frame comprises multiplying each of said pixel values of the frame by the enhancement value for the frame.

61. The method as defined by claim 50, wherein said step of combining the pixel values of each of the stored frames with the enhancement value for the frame comprises multiplying each of said pixel values of the frame by the enhancement value for the frame.

62. The method as defined by claim 57, wherein said step of combining the pixel values of each of the stored frames with the enhancement value for the frame comprises multiplying each of said pixel values of the frame by the enhancement value for the frame.

* * * * *